United States Patent [19]

Jonner et al.

[11] Patent Number: 4,805,965

[45] Date of Patent: Feb. 21, 1989

[54] APPARATUS FOR SYNCHRONIZING THE RPM OF DRIVE WHEELS OF A MOTOR VEHICLE UPON STARTING

[75] Inventors: Wolf-Dieter Jonner, Beilstein; Guenter Kaes, Stuttgart; Wolfgang Maisch; Alwin Stegmaier, both of Schwieberdingen, all of Fed. Rep. of Germany

[73] Assignee: Robert Bosch GmbH, Stuttgart, Fed. Rep. of Germany

[21] Appl. No.: 163,674

[22] Filed: Mar. 3, 1988

[30] Foreign Application Priority Data

Mar. 5, 1987 [DE] Fed. Rep. of Germany ....... 3707068

[51] Int. Cl.⁴ .......................... B60K 28/16; B60T 8/32
[52] U.S. Cl. ..................................... 303/100; 180/197; 180/244; 303/93; 303/110; 303/113; 303/117; 303/98
[58] Field of Search .................... 303/110, 100, 96–98, 303/93, 113–119, 92, 99, 102, 111, 61, 13–17; 180/197, 233–250

[56] References Cited

U.S. PATENT DOCUMENTS

| | | | |
|---|---|---|---|
| 3,420,580 | 1/1969 | Dymond | 303/116 |
| 3,893,535 | 7/1975 | Burckhardt et al. | 180/197 |
| 3,952,511 | 4/1976 | Turner et al. | 180/244 X |
| 4,082,369 | 4/1978 | Black et al. | 303/116 X |
| 4,206,950 | 6/1980 | Elliott | 303/110 |
| 4,236,595 | 12/1980 | Beck et al. | 180/197 X |
| 4,401,182 | 8/1983 | Pollman | 180/197 X |
| 4,571,010 | 2/1986 | Dittner et al. | 303/110 |
| 4,575,161 | 3/1986 | Vanzant et al. | 303/110 |
| 4,589,511 | 5/1986 | Leiber | 180/197 |
| 4,653,815 | 3/1987 | Agarwal et al. | 303/113 X |

FOREIGN PATENT DOCUMENTS 2128278  4/1984 United Kingdom .

OTHER PUBLICATIONS

Journal "fluid", Jan. 1984, p. 11.

Primary Examiner—Douglas C. Butler
Attorney, Agent, or Firm—Edwin E. Greigg

[57] ABSTRACT

In a so-called starting aid for motor vehicles, synchronism in the rpm of the drive wheels during starting is provided by feeding a brake pressure derived from the rpm difference of the drive wheels into the wheel brake cylinder associated with the wheel having the higher rpm. To this end, one brake pressure controller having a control piston and a valve is installed in each brake line to the wheel brake cylinders of at least two wheel brakes. The control pistons are actuated in opposite directions via a final control element to which a control signal derived from the rpm difference is supplied. Upon displacement, whichever control piston is driven closes the valve and feeds brake pressure into the associated wheel brake cylinder. In order that the starting aid will have a high control speed and a small structural volume, the final control element is embodied as an electric control motor.

15 Claims, 3 Drawing Sheets

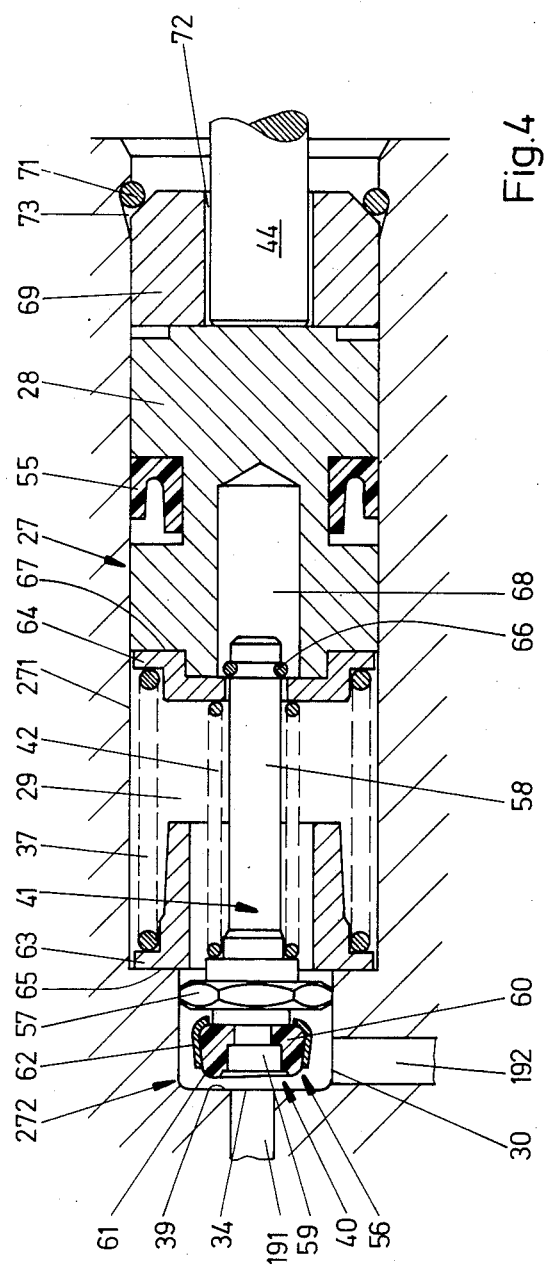

4,805,965

APPARATUS FOR SYNCHRONIZING THE RPM OF DRIVE WHEELS OF A MOTOR VEHICLE UPON STARTING

BACKGROUND OF THE INVENTION

The invention is based on an apparatus for synchronizing the rpm of drive wheels upon starting of a motor vehicle, equipped with a pressure-fluid-controlled brake system, in which the synchronizing is performed by applying a metered brake pressure to the drive wheel having the higher rpm.

In a known starting aid of this type (see the journal *Fluid*, January, 1984, p. 11), the final control element is embodied as a diaphragm motor, which is triggered with an air pressure or vacuum derived from the control signal and via drive members coupled with the diaphragm actuates one or the other control piston of the brake pressure controllers aligned with one another. This kind of final control element is relatively slow and requires a rather large air or vacuum reservoir, which in the case of Diesel engines necessitates a separate vacuum pump.

In another known apparatus of this generic type (British Pat. No. 2,128,278), the final control element comprises two electromagnets, on each of the armatures of which a respective control piston of each of the two brake pressure controllers is supported, under the influence of its restoring spring. The control signals are supplied as an exciter current, in accordance with a positive or negative rpm difference, to one or the other electromagnet, thereby displacing the associated control piston in the direction for decreasing the volume defined by it and thus feeding a brake pressure into the wheel brake cylinder connected with it. The heavy electromagnets required for this kind of final control element allow only a relatively slow armature motion, so that only a sluggish control of brake pressure is attainable.

OBJECT AND SUMMARY OF THE INVENTION

The starting aid apparatus according to the invention has the advantage of a higher control speed as compared with pneumatic final control elements and a higher pressure range as compared with electromagnetic final control elements, as well as a smaller structural volume and a lower energy requirement. The apparatus is largely failsafe, because if the electric control motor fails, the control pistons return to their zero position, and no brake pressure is fed in. As compared with pneumatic versions, voluminous reservoirs and the necessity for a supply of compressed air are eliminated. The apparatus according to the invention is both structurally very simple and capable of being manufactured economically, and hence is particularly well suited for smaller, relatively inexpensive motor vehicles. Its operation is entirely independent of the brake circuit layout in the vehicle.

Furthermore, as disclosed, the conversion gear that converts the rotary motion of the rotor shaft into a displacement motion is embodied in a low-friction manner. The self-locking effect typical of spindle or worm drives thus does not arise. After the control motor is shut off the control pistons return to the initial position, in which no pressure is fed into the wheel brake cylinder, and the connection between the master brake cylinder and the wheel brake cylinder is opened by the valve.

Additional advantages of the invention concern the constructional provisions which serve as the basis for an economical, easily assembled braking power controller, in which the valve and the springs (the control piston restoring spring and the valve spring) can be preassembled as a complete mounting unit. This mounting unit is then inserted into the control cylinder, and then the control piston is inserted, and the control cylinder is closed off with a closure member. The installation time is thus shortened considerably. Because of the axially disposed valve, only one cup seal needs to be provided for the control piston.

Other advantageous embodiments of the invention is revealed herein particularly a construction which makes the manufacture and assembly of the brake pressure controller easier. By a suitable selection of the cone angle and of the overlap ratio (undercut) of the rubber element and the support collar, on the one hand, and the metal armoring and the rubber element, on the other, safe and reliable functioning of the valve can be attained. An angle of 5°–10° for the flank of the conical rubber element and a diameter ratio of the overlap edge (inside diameter) of the rubber element to the outside diameter of the supporting collar of 0.6–0.8 have proved to be advantageous.

Another advantasgeous embodiment of the invention is also explained hereinafter. Separating the control piston and the drive bolt prevents the induction of a shear force into the running surface of the control piston, which would make the control piston move sluggishly.

The invention will be better understood and further objects and advantages thereof will become more apparent from the ensuing detailed description of preferred embodiments taken in conjunction with the drawings.

BRIEF DESCRIPTION OF THE DRAWINGS

FIG. 4 is a longitudinal section through a brake pressure controller in the starting aid apparatuses of FIGS. 1–4 in accordance with a preferred exemplary embodiment; and FIG. 5 shows a preassembled component unit of the brake pressure controller of FIG. 4.

DESCRIPTION OF THE PREFERRED EMBODIMENTS

Figure 1:
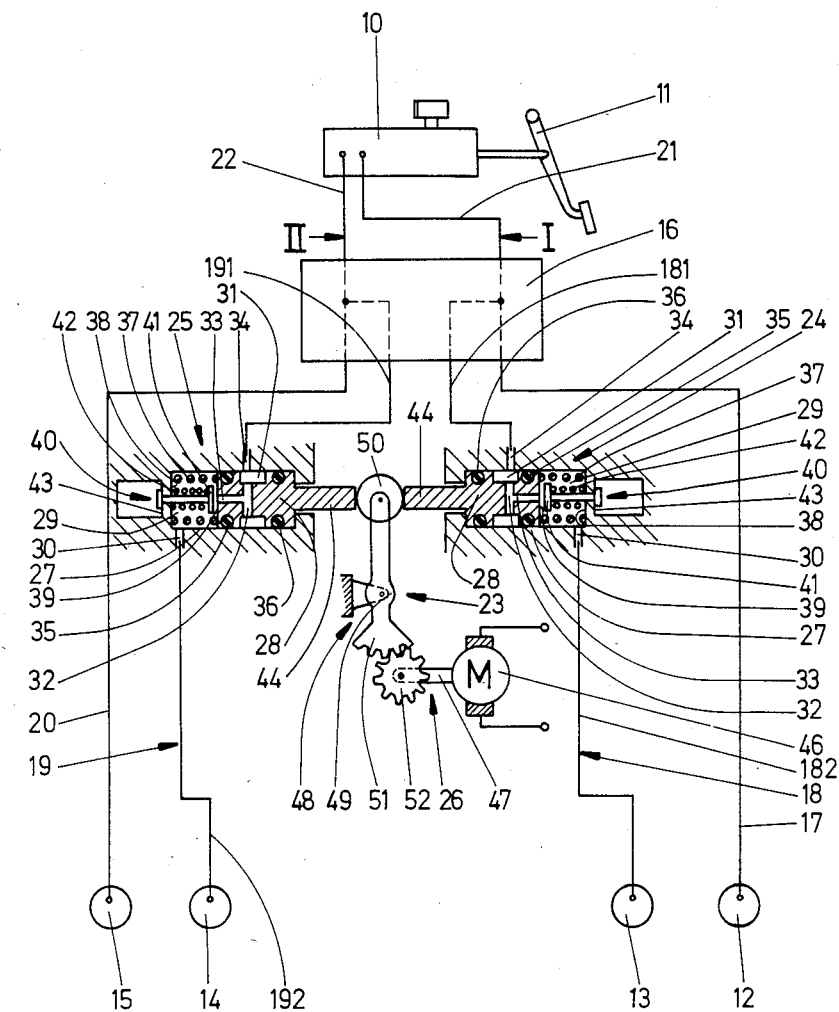
FIG. 1 shows the basic layout of part of a hydraulic brake system for a passenger car having a first embodiment of a starting aid apparatus according to the invention.

Of the hydraulic brake system for a passenger car or automobile that is shown schematically and in part in FIG. 1, only one master brake cylinder 10, which is mechanically actuated by a brake pedal 11, and the wheel brake cylinders 12–15 for the vehicle wheels are shown. Pairs of wheel brake cylinders 12, 13 and 14, 15, respectively, are disposed in two independent brake circuits I and II, the wheel brake cylinders 13, 14 being assigned to the drive wheels, in this case the rear wheels. The brake system is typically also equipped with an anti-skid system (ABS) 16, which is incorporated into the brake circuits I and II between the master brake cylinder 10 and the wheel brake cylinders 12–15. Each wheel brake cylinder 12–15 communicates via a separate brake line with the ABS 16, which is connected via one pressure line 21 and 22 per brake circuit I and II, respectively, to the master brake cylinder 10.

The apparatus for synchronizing the rpm of the drive wheels upon starting, hereinafter called simply the starting aid apparatus 23, is installed in the brake lines 18, 19 leading to the wheel brake cylinders 13, 14 of the drive wheels. It comprises two brake pressure controllers 24, 25 and one final control element 26 for actuating the brake pressure controllers 24, 25 as a function of the rpm difference in the drive wheels during starting. In a manner not shown in detail, the rpm of the drive wheels is detected by wheel sensors, which are necessary in any case for the anti-skid system 16. The two brake pressure controllers 24, 25 are embodied identically and are oriented in axial alignment with one another. Each brake pressure controller 24 and 25 has its own control cylinder 27, in which a control piston 28 is axially displaceable. The control piston 28 defines a control chamber 29, which has a connection opening 30 for connecting the brake line segment 182 or 192, respectively, to the wheel cylinder 13 or 14 of the drive wheel. The control piston 28 has an annular groove 31, which communicates via a transverse bore 32 with an axial bore 33 in the control piston 28 that discharges into the control chamber 29. In every position of the control piston 28, the annular groove 31 coincides with a connection opening 34, to which the segment 181 or 191, of the brake line 18 or 19, that leads to the ABS 16 is connected. On both sides of the 16 is connected. On both sides of the annular groove 31, the control piston 28 is sealed off from the control cylinder 27 by means of respective cup seals 35 and 36. The control piston 28 is retained in its basic position by a restoring spring 37 disposed in the control chamber 29 and supported on one end on the control piston 28 and on the other on a stop 38 in the control chamber 29. The opening of the axial bore 33 in the control piston 28 is surrounded by a valve seat 39, which cooperates with a valve member 41 of a valve 40. The valve member 41 rests, spaced apart from and upstream of the valve seat 39, on a stop 43 under the influence of a valve spring 42. Upon displacement of the control piston 28, the valve seat 39 assumes its seat on the valve member 41, sealing off the orifice of the axial bore 33 toward the end face, and displaces the valve member 41 counter to the action of the valve spring 42 when the valve 40 is closed. The control piston 28 protrudes from the control cylinder 27 of the brake pressure controller 24 or 25 and is provided with an integral drive means 44.

the final control element 26 is embodied as an electric control motor 46, specifically a rotary motor, the rotor shaft 47 of which actutates one of the two drive members 44 of the brake pressure controllers 24, 25 via a conversion gear 48 that converts the rotary motion of the rotor shaft 47 into a linear motion. To this end, the conversion gear 48 has a two-armed lever 49. A roller 60 is disposed on one end of this lever, and a toothed quadrant 51 is disposed on the other. The toothed segment 51 meshes with a gear wheel 52 that rotates with the rotor shaft 47, while the drive bolts 44 of the control pistons 28 of the two brake pressure controllers 24, 25, under the influence of the restoring springs 37, rest on diametrically opposed sides of the roller 50.

The mode of operation of the starting aid apparatus 23 is as follows:

In the inactive state of the starting aid apparatus 23, the valves 40 in both brake pressure controllers 24, 25 are opened, so that both brake lines 18, 19 are open between the anti-skid system 16 and the wheel brake cylinders 13, 14 of the drive wheels, and any brake pressure that is fed in via the master brake cylinder 10 by actuation of the brake pedal 11 reaches the wheel brake cylinders 13, 14. If upon starting one of the two brake cylinders 13, 14 is rotating faster than the other one, because of poorer wheel grip, then from the rpm signals furnished by the wheel sensors to a control unit, not shown, a control signal proportional to the rpm difference is generated and reaches the control motor 46. The rotor shaft 47 is rotated in accordance with this control signal, and the gear wheel 52 meshing with the toothed quadrant 51 pivots the lever 49 to the the right or left, depending upon the direction of rotation of the rotor shaft 47. If the drive wheel associated with the wheel brake cylinder 13 has the higher rpm, the lever 49 is pivoted to the right. As a result, the control piston 28 of the brake pressure controller 24 is displaced to the right, via the roller 50. After a short displacement travel, the valve seat 39 assumes its seat upon the valve member 41, and the brake line 18 is disconnected, whereupon the communication between the control chamber 29 and the brake line segment 181 is sealed off. With the further displacement of the control piston 28, the volume of the control chamber 29, with the valve 40 kept closed, is reduced still further, resulting in the feeding of a brake pressure into the wheel brake cylinder 13 via the brake line segment 182. The control piston 28 is displaced until such time as the brake pressure fed into the wheel brake cylinder 13 reduces the rpm difference to zero. After the starting process is over, the control piston 28 returns to the basic position shown in FIG. 1 under the influence of its restoring spring 37. The same process takes place in the brake pressure controller 25, if it is the drive wheel associated with the wheel brake cylinder 14 that is rotating at a higher rpm than the other brake cylinder 13.

Figure 2:
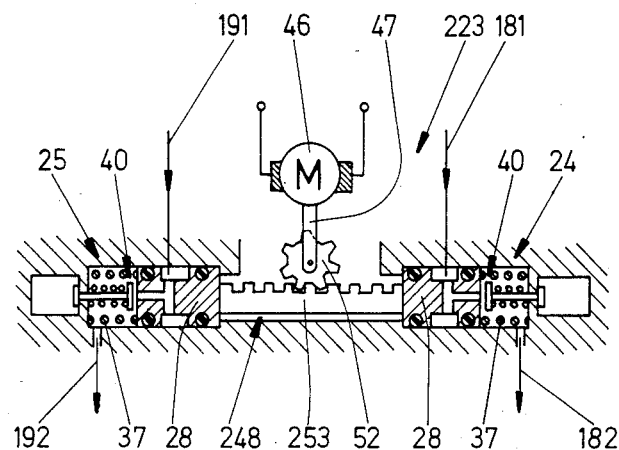
FIG. 2 is a longitudinal section through a starting aid apparatus of a second exemplary embodiment.

The starting aid apparatus 223 shown schematically in FIG. 2 is substantially the equivalent to that of FIG. 1, and so identical components are identified by the same reference numerals. While the brake pressure controllers 24, 25 and the control motor 46, with its rotor shaft 47 and gear wheel 52, are identical to those shown in FIG. 1, the conversion gear 248 is modified. The conversion gear includes a rack 253, which is axially displaceably guided and meshes with the gear wheel 52. A respective control piston 28 of each of the two brake pressure controllers 24, 25 rests on each face end of the rack 253, under the compression force of the respective restoring springs 37. Upon rotation of the controlmotor 46, the rotating gear wheel 52 displaces the rack 253 to the left or right, depending on the direction of rotation of the control motor 46, and displaces one of the two control pistons 28 in the same manner as described above.

Figure 3:
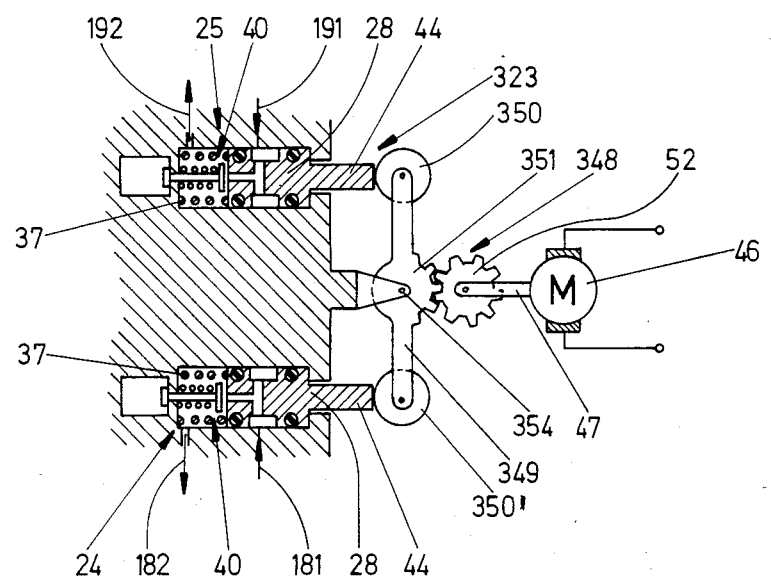
FIG. 3 is a longitudinal section through a starting aid apparatus of a third exemplary embodiment.

In the exemplary embodiment of the starting aid apparatus 323 shown in FIG. 3, the two brake pressure controllers 24, 24, which are identical to one another and to those of FIG. 1, are disposed parallel to and spaced apart from one another. The conversion gear 348 again has an oscillatory two-armed lever 349, which is supported precisely in the middle between the two brake pressure controller 24, 25, about a stationary pivot point 354. On each end, the lever 349 has a roller 350 and 350', respectively, one each of which a respective control piston 28 of the two brake pressure controllers 24, 25 rests via their drive bolts 44, under the influence of their restoring springs 37. In the vicinity of its pivot point 354, the lever 49 has a toothed quadrant 351, which again meshes with the gear wheel 52 seated in a manner fixed against relative rotation on the rotor shaft 47 of the control motor 46. If the rotor shaft 47 rotates about a specific rotational angle in response to a control signal reaching the control motor 46, the lever 349 is pivoted and displaces one control piston 28 of the two brake pressure controllers 24, 25, and in the same manner as described in connection with FIG. 1 a brake pressure is fed into the particular wheel brake cylinder 13 or 14 that is associated with the drive wheel rotating at the higher rpm.

A preferred embodiment of a brake pressure controller, which can be used as the brake pressure controller 24 or 25 in a starting aid apparatus 23, 223 or 323 of FIGS. 1-3, is shown in FIG. 4 in longitudinal cross section. The control cylinder 27 has two cylinder segments 271 and 272 of different lengths. In the longer first segment 271, the control piston 28 is guided in an axially displaceable manner, being sealed off from the inner cylinder wall of the first cylinder segment 271 by an annular cap seal 55. The valve 40 is disposed in the second cylinder segment 272, the inside diameter of which is reduced as compared with that of the first cylinder segment 271. The connection opening 30 for connecting the brake line segment 192 which here leads to the wheel brake cylinder 14 and the connection opening 34 for connecting the brake line segment 191 leading to the master cylinder 10 or to the anti-skid system 15 are disposed axially in the second cylinder segment 272, which together with a variable portion of the first cylinder segment 271 forms the control chamber 29, defined by the end face of the control piston 28, of the brake pressure controller. The valve seat 39 surrounds the connection opening 34, on which the closing head 56 of the again axially displaceable valve member 41 can be seated. The valve member 41 has a guide flange 47 protruding radially beyond the closing head 56 which serves to guide the valve member 41 in the second cylinder segment 272. The valve member 41 has a shaft 58, which penetrates the first cylinder segment 271 from the control piston 28 onward and terminates at the face end of the second cylinder segment 272 in the form of a support collar 59. A rubber element 60 having a sealing lip 61 at the face end is snapped onto the support collar 59, gripping it from behind. With the valve 40 closed, the sealing lip 61 is pressed onto the valve seat 39 and the connection opening 34 is thus sealed off. To prevent the rubber element 60 from being pulled off unintentionally, this element is secured on the support collar 59 by means of a metal armoring 62. The rubber element 60 is conical and tapers toward the valve seat 39. The angle of the flanks of the cone is approximately 5° to 10°. The rubber element 60 grips the support collar 59 from behind, and the metal armoring 62 grips the rubber element 60 from behind. With a suitable embodiment of the overlapping edges, the rubber element 60 is reliably prevented from being pulled off upon opening of the valve 40 or when brake pressure is fed into the wheel brake cylinders 13, 14.

The restoring spring 37 for the control piston 28 is supported on two spring plates 63 and 64 which coaxially surround the valve member 41, specifically the shaft 58. One spring plate 63 rests on the annular transition shoulder 65 between the first cylinder segment 271 and the second cylinder segment 272. The inside diameter of this shoulder is selected to be smaller than the outside diameter of the guide flange 57. The other spring plate 64 is disposed axially displaceably on the shaft 58 of the valve member 41 and on the end of the shaft 58 remote from the closing head 56 can be placed against a stop 66, under the influence of the restoring spring 37. The valve spring 42 is supported at one end on the spring plate 64 and at the other on the shaft 58 of the valve member 41. On its end face defining the control chamber 29, the control piston 28 has a support face 69 for the spring plate 64. The control piston 28 also has a central, axially extending blind bore 68, which discharges at the end face of the control piston 28 defining the control chamber 29. The blind bore 68 has a depth such that at the maximum displacement travel of the control piston 28, a portion of the shaft 58 of the valve member 41 can plunge into the blind bore 68 without hindering the displacement travel of the control piston 28.

Because of the provision of the two spring plates 63, 64 and their structural embodiment and disposition on the valve member 41, it is possible to preassemble the valve member 41 and the restoring spring 37 and valve spring 42 to make a complete component unit 70. This component unit 70 is shown in FIG. 5. As shown there, the spring plate 63 rests on the guide flange 57 in response to the pressure of the restoring spring 37, while the spring plate 64 is placed against the stop 66. When the brake pressure controller is being assembled, this preassembled component unit 70 is inserted into the control cylinder 27 from the right, as seen in FIG. 4, until the closing head 56 of the valve member 41 along with the guide flange 57 plunges into the second cylinder segment 272, and the spring plate 63 is supported on the transition shoulder 65 between the cylinder segments 271 and 272. After that, the control piston 28 with its cup seal 55 is inserted, and finally the control cylinder 27 is closed with a closure element 69. The closure element 69 is retained by a securing ring 71 that is emplaced in a recess 72 of the cylinder wall. The closure element 69 has a central guide bore 73, in which the drive member 44 for the control piston 28 is axially displaceably guided. the drive member 44 is embodied here as a separate component, not as part of the control piston, and rests on the control piston 28 under the influence of the final control element 26 (not shown in FIG. 4) engaging it. By dividing the control piston 28 and the drive member 44 into two parts, shear forces are prevented from being imposed upon the running surface of the piston which would cause sluggish operation of the control piston 28.

The mode of operation of this brake pressure controller is the same as that described for FIG. 1. By displacement of the control piston 28 via the drive piston 44 actuated via the final control element 26, the valve member 41 is first displaced until the sealing lip 61 of the closing head 56 rests on the valve seat 39. Upon further displacement of the control piston 28 counter to its restoring spring 37, the valve spring 42 is then compressed, and as a result exerts increasing closing force upon the closing head 56. Since the brake line segment 191 is now closed off, and the control chamber 29, the brake line segment 192 and the wheel brake cylinder 14 are now filled with brake fluid, the reduction of the control chamber volume by the displacement of the control piston 28 causes a brake pressure that is metered in accordance with the rpm difference between the drive wheels to be fed into the associated wheel brake cylinder 14.

The invention is not limited to the exemplary embodiments described above. For instance, in a modification of FIG. 2, the final control element 26 can also be embodied as a linear motor, its rotor being embodied by the rack 253. Nor is an anti-skid system an indispensable component of the brake system. If there is no anti-skid system, then the pressure lines are connected directly to the master brake cylinder. Separate rpm sensors must be provided for the drive wheels.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. An apparatus for synchronizing the rpm of drive wheels upon starting of a motor vehicle equipped with a pressure-fluid-controlled brake system having suitable brake lines extending to the brakes by application of metered brake pressure to the wheel having the higher rpm, at least two brake pressure controllers incorporated one in each brake line between a master brake cylinder of the brake system and one wheel brake cylinder of one of the at least two drive wheels, said controllers each having one control piston axially displaceable in a control cylinder counter to a restoring spring and one valve each in said control cylinder actuated by said control piston arranged to control the connection opening of the control cylinder to the master brake cylinder, a final control element adapted to drive the control piston in contrary directions actuatable by a control signal derived from the rpm difference between the at least two drive wheels, and an electric reversible control motor (46) adapted to drive one or the other of said control pistons (28), said control motor (46) is a rotary motor which includes a shaft (47) which acts upon said control pistons (28) of the brake pressure controllers (24, 25) via a conversion gear (48; 248; 348) and thereby is adapted to convert the rotational motion into a displacement motion.

2. An apparatus as defined by claim 1, in which the conversion gear (48) has a two-armed lever (49), including a first lever end provided with a roller (50) which engages drive members (44), said drive members being integral with the control pistons (28) of the brake pressure controllers (24, 25) and in axial alignment with one another and further that the other lever end has a toothed quadrant (51), which meshes with a gear wheel (52) adapted to be operated by said control motor (46).

3. An apparatus as defined in claim 2, in which the control cylinder (27) has a first cylinder segment (271) in which the control piston (28) is sealed off slidably in said cylinder, an adjoining second cylinder segment (272) of reduced diameter, in which the connection opening (34) to the master brake cylinder (10) is disposed axially and the connection opening (30) which extends to the wheel brake cylinder (13, 14) is disposed radially relatively to the cylinder axis, further that the valve (40) has a valve member (41) that is displaceable relative to the control cylinder (27) and includes a terminal closing head (56), said valve member guided in said second cylinder segment (272) and supported on control piston (28) via a valve spring (42), and further that an annular transition shoulder (65) disposed between the two cylinder segments (271, 272) forms an abutment to support the restoring spring (37) of control piston (28).

4. An apparatus as defined by claim 1, in which the conversion gear (348) further includes an oscillatable two-armed lever (349), each lever arm of which includes a roller means (350, 350') adapted to engage a drive member (44) and therethrough a control piston (28) of the two brake pressure controllers (24, 25) disposed parallel to one another, and further that the oscillatable lever (349), has a pivot point (354), said pivot point having a toothed quadrant (351) that meshes with a gear wheel (52) seated on the motor shaft (47).

5. An apparatus as defined in claim 4, in which the control cylinder (27) has a first cylinder segment (271) in which the control piston (28) is sealed off slidably in said cylinder, an adjoining second cylinder segment (272) of reduced diameter, in which the connection opening (34) to the master brake cylinder (10) is disposed axially and the connection opening (30) which extends to the wheel brake cylinder (13, 14) is disposed radially relatively to the cylinder axis, further that the valve (40) has a valve member (41) that is displaceable relative to the control cylinder (27) and includes a terminal closing head (56), said valve member guided in said second cylinder segment (272) and supported on control piston (28) via a valve spring (42), and further that an annular transition shoulder (65) disposed between the two cylinder segments (271, 272) forms an abutment to support the restoring spring (37) of control piston (28).

6. An apparatus as defined by claim 1, in which the conversion gear (248) further includes a rack (253) and a gear wheel (52) is adapted to mesh therewith, said gear wheel fixed against inadvertent relative rotation on the motor shaft (47), and further that the control pistons (28) of the two axially aligned brake pressure controllers (24, 25) are integrated on the two ends of the rack (253), thereby embodying a common drive means for the control pistons (28), under the force of their restoring springs (37).

7. An apparatus as defined in claim 6, in which the control cylinder (27) has a first cylinder segment (271) in which the control piston (28) is sealed off slidably in said cylinder, an adjoining second cylinder segment (272) of reduced diameter, in which the connection opening (34) to the master brake cylinder (10) is disposed axialy and the connection opening (30) which extends to the wheel brake cylinder (13, 14) is disposed radially relatively to the cylinder axis, further that the valve (40) has a valve member (41) that is displaceable relative to the control cylinder (27) and includes a terminal closing head (56), said valve member guided in said second cylinder segment (272) and supported on control piston (28) via a valve spring (42), and further that an annular transition shoulder (65) disposed between the two cylinder segments (271, 272) forms an abutment to support the restoring spring (37) of control piston (28).

8. An apparatus as defined in claim 1, in which the control cylinder (27) has a first cylinder segment (271) in which the control piston (28) is sealed off slidably in said cylinder, an adjoining second cylinder segment (272) of reduced diameter, in which the connection opening (34) to the master brake cylinder (10) is disposed axially and the connection opening (30) which extends to the wheel brake cylinder (13, 14) is disposed radially relatively to the cylinder axis, further that the valve (40) has a valve member (41) that is displaceable relative to the control cylinder (27) and includes a terminal closing head (56), said valve member guided in said second cylinder segment (272) and supported on control piston (28) via a valve spring (42), and further that an annular transition shoulder (65) disposed between the two cylinder segments (271, 272) forms an abutment to support the restoring spring (37) of control piston (28).

9. An apparatus as defined by claim 8, in which said valve member (41) has a guide flange (57) adapted to protrude radially beyond the closing head (56), said restoring spring (37) for said control piston (28) being supported at one end on a spring plate (63) which abuts the transition shoulder (65) disposed between the cylinder segments (271, 272) the inside diameter of the spring plate (63) being smaller than the outside diameter of the guide flange (57), the other end of said restoring spring being supported on a second spring plate (64) which is axially displaced on the valve member (41), the second spring plate (64) being positioned against a stop (66) disposed on the end of the valve member (41) remote from the closing head (56), and further that the control piston (28) has an axial blind bore (68) adapted to receive a portion of the valve member (41) upon its axial displacement as well as a support face (67) for the second spring plate (64).

10. An apparatus as defined by claim 9, in which the valve member (41) has a shaft (58), a support collar (59) integral with said shaft adapted to protrude beyond the circumference of the shaft, said terminal closing head (56) comprising a rubber element (60) which is snapped onto a support collar (59), a sealing lip (61) on the rubber element (60) and said rubber element secured against removal by a metal armoring (62).

11. An apparatus as defined by claim 9, in which the first cylinder segment (271) of the control cylinder (27) is closed off from the second cylinder segment (272), by a closure element (69), and that the drive means (44) for the control piston (28) is axially displaceably guided therein.

12. An apparatus as defined by claim 8, in which the valve member (41) has a shaft (58), a support collar (59) integral with said shaft adapted to protrude beyond the circumference of the shaft, said terminal closing head (56) comprising a rubber element (60) which is snapped onto a support collar (59), a sealing lip (61) on the rubber element (60) and said rubber element secured against removal by a metal armoring (62).

13. An apparatus as defined by claim 12, in which the first cylinder segment (271) of the control cylinder (27) is closed off from the second cylinder segment (272), by a closure element (69), and that the drive means (44) for the control piston (28) is axially displaceably guided therein.

14. An apparatus as defined by claim 8, in which the first cylinder segment (271) of the control cylinder (27) is closed off from the second cylinder segment (272), by a closure element (69), and that the drive means (44) for the control piston (28) is axially displaceably guided therein.

15. An apparatus as defined in claim 1, in which the control cylinder (27) has a first cylinder segment (271) in which the control piston (28) is sealed off slidably in said cylinder, an adjoining second cylinder segment (272) of reduced diameter, in which the connection opening (34) to the master brake cylinder (10) is disposed axially and the connection opening (30) which extends to the wheel brake cylinder (13, 14) is disposed radially relatively to the cylinder axis, further that the valve (40) has a valve member (41) that is displaceable relative to the control cylinder (27) and includes a terminal closing head (56), said valve member guided in said second cylinder segment (272) and supported on control piston (28) via a valve spring (42), and further that an annular transition shoulder (65) disposed between the two cylinder segments (271, 272) forms an abutment to support the restoring spring (37) of control piston (28).

* * * * *